Sept. 12, 1967     R. L. VICK     3,341,210

HIGH PRESSURE SEAL

Filed Dec. 30, 1964

INVENTOR.
RALPH L. VICK
BY
Robert C. Smith
ATTORNEY

United States Patent Office 3,341,210
Patented Sept. 12, 1967

3,341,210
HIGH PRESSURE SEAL
Ralph L. Vick, Granada Hills, Calif., assignor to The Bendix Corporation, North Hollywood, Calif., a corporation of Delaware
Filed Dec. 30, 1964, Ser. No. 422,198
1 Claim. (Cl. 277—165)

This invention relates to fluid seals between relatively reciprocable members, such as pistons and cylinders and piston rods and cylinder heads, as examples, and for relatively rotating members such as shafts in housings. It is particularly adapted for hydraulic and pneumatic systems where high pressure differentials and/or high temperatures are involved.

It is an object of the present invention to provide a comparatively inexpensive seal which remains fluid-tight for extended periods during exposure to high fluid pressure differentials.

It is a further object of the present invention to provide a seal meeting the above objectives and which has comparatively low friction and high resistance to abrasion.

Figure 1:
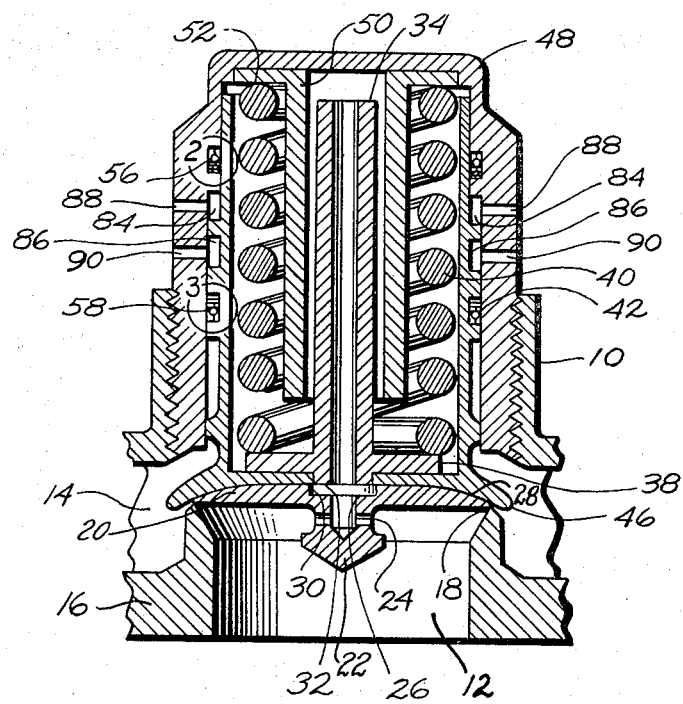
Figure 3:
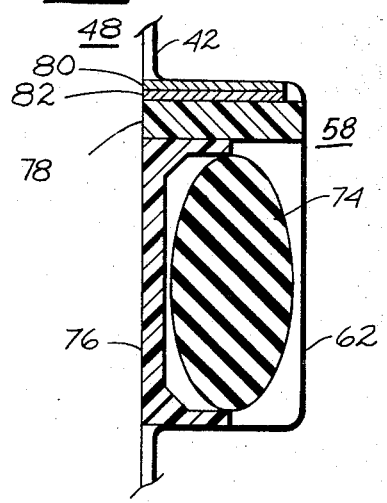
Figure 2:
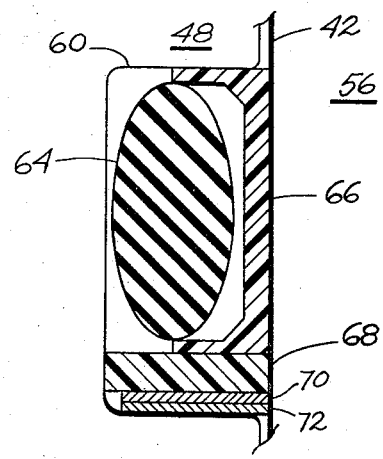

Other objects and advantages will become apparent from the following specification taken in connection with the accompanying drawing, in which:

FIGURE 1 is a sectional view of a valve structure utilizing seals according to the present invention; and FIGURES 2 and 3 are enlarged cross-sectional views of the seals shown in FIGURE 1.

Referring now to FIGURE 1, a casing is shown at numeral 10 including an inlet passage 12 and an outlet passage 14. Fastened to housing 10 is an annular member 16 which serves as an inlet passageway and which carries a valve seat 18. A poppet valve member 20 is arranged to close on valve seat 18. Poppet member 20 includes an inwardly extending projection 22 which deflects fluid flow in inlet passage 12 outwardly toward outlet passage 14 and which contains a plurality of small orifices 24 which communicate with a passageway 26 on the outer side of poppet member 20. These orifices and the chamber downstream of passageway 26 form a damping arrangement which prevents valve instability. The outer surface of poppet member 20 includes a partially spherical surface 28 and a hollow-out guide section 30. Carried in guide section 30 is a projecting guide 32 forming part of a cylindrical member 34, the interior of which constitutes a continuation of passageway 26. Member 34 also includes a radially extending section 38 which constitutes one of two retainer sections for a spring 40.

A piston member 42 is carried on poppet member 20 and includes a partially spherical surface in mating relationship with a corresponding surface of poppet 20. Piston 42 includes a skirt 46 extending downwardly past the valve seat 18. By deflecting the fluid passing valve seat 18 downwardly as it leaves the seat, a reactive component is produced which tends to aid the fluid pressure in inlet passage 12 in moving poppet 20 in an opening direction.

Threadedly engaged with housing 10 is a cap member 48. A cylindrical baffle 50 extends from the top of cap member 48 in such manner as to surround concentrically the cylindrical member 34. Baffle 50 also includes an annular flange 52 which serves as the upper retainer for spring 40.

The poppet assembly including poppet 20, cylindrical member 34, and piston 42 is free to move upwardly under pressure from the inlet chamber 12 by an amount equal to the clearance between the top of piston 42 and the inside surface of the top of cap 48. Since the radius at valve seat 18 is comparatively large, very small movement of the poppet assembly is necessary in order to provide a substantial metering area. The specific structure shown in FIGURE 1 has been designed as a hot gas relief valve, and the circuitous path defined by passages 24, 26 and the interior of baffle 50 provide a means of absorbing and dissipating some of the heat of the gas supplied to the chamber containing spring 40. This chamber, once filled, is essentially stagnant but may contain gas at relatively high operating temperatures and pressures. This gas is contained by means of a pair of annular seals 56 and 58 positioned between piston 42 and cap 48.

Seals 56 and 58, which are shown in greater detail in FIGURES 2 and 3, respectively, are essentially identical except that seal 56 is located on an internal surface of the stationary outside member 48 and must permit the internally positioned member 42 to slide relative to itself while seal 58 is located on the outside of piston 42 where it seals to the outside against the stationary member 58 within which it moves.

Seal 56 is located in a groove 60 in cap 48, and seal 58 is located in a groove 62 in piston 42. Seal 56 consists of a number of parts including a flexible O-ring 64, which may be of synthetic rubber or other material to suit particular environmental conditions. O-ring 64 is held in position between the bottom of the groove 60 and the inside surface of a sealing ring 66 which is preferably of polytetrafluorethylene material (Teflon) which is in direct contact with the piston 42. An additional Teflon ring 68 is included on the low pressure side of the O-ring 64 and aids in preventing the O-ring from being forced out from under sealing ring 66 when the seal is subjected to high pressure differentials. A pair of additional thin section steel rings 70 and 72 are positioned within groove 60 on the low pressure side of ring 68. The Teflon rings 66 and 68 are quite stiff and hard at normal pressures and temperatures, but this material has a tendency to flow when subjected to high pressure, especially when applied in combination with high temperatures. Steel rings 70 and 72 fit fairly tightly against the surface of piston 42, thereby preventing any flow of the material of rings 66 and 68. At the same time, the effective area of metal-to-metal contact is slight compared to the area in contact with the Teflon material, so friction of the seal is not high. Rings 70 and 72 are split to make possible their installation in groove 60, but their openings are placed out of registry with each other so that there will be minimum extrusion gap across said rings.

The structure of seal 58 is analogous to that described above and includes a flexible D-ring 74 which is held in position between the bottom of the groove 62 and the inside surface of a sealing ring 76. An additional Teflon ring 78 is located in groove 62 on the side of O-ring 74 opposite the high pressure source to assist in effecting the desired seal and to aid in retaining the O-ring 74 and sealing ring 76 which have a tendency to flow under pressure or heat and pressure. A pair of split steel rings 80 and 82 are positioned on the low pressure side of ring 78 to counteract any tendency of the rings 76 and 78 to flow out of the groove. It will be observed that the arrangements of the parts in grooves 60 and 62 are reversed, since the small annular chambers 84 and 86 located between seals 56 and 58 are in communication with the atmosphere or other low pressure source through a plurality of small passageways 88 and 90.

Although for the purpose of explaining the invention a particular embodiment thereof has been shown and described, obvious modifications will occur to a person skilled in the art, and I do not desire to be limited to the exact details shown and described.

I claim:

A fluid seal for sealing between two relatively movable members having slidably fitted complementary cylindrical working surfaces operating in an environment where pressure and temperature conditions tend to cause flow of plastic materials, one of which contains an annular groove juxtaposed to the other working surface, said seal comprising:
- a sealing ring of plastic material having self-lubricating qualities and of generally U-shaped cross-section positioned in said annular groove, said ring having an axial dimension substantially less than the width of said groove, radial flanges extending inwardly of said groove to at least 40% of the depth of the groove and a center section which is thinner axially than the section at its edges;
- a circumferentially continuous deformable O-ring positioned back of said sealing ring, the combined radial thickness of said sealing ring and said O-ring when the latter is in its free state being greater than the radial depth of the groove, and the sealing ring being substantially stiffer than the O-ring whereby the O-ring is radially compressed between the bottom of the groove and the sealing ring when the seal is installed in the groove forcing the center section of said sealing ring against said other working surface;
- a second sealing ring of plastic material having self-lubricating qualities having a radial dimension substantially the same as said groove positioned in said groove on the side of said first named sealing ring opposite the high pressure side thereof; and
- a pair of split metal sealing rings also of substantially the same diameter as the other of said working surfaces positioned between said second sealing ring and the side of said groove.

References Cited

UNITED STATES PATENTS

| | | | |
|---|---|---|---|
| Re. 24,440 | 3/1957 | Groen | 277—165 |
| 2,905,489 | 9/1959 | Thompson | 277—188 |

LAVERNE D. GEIGER, *Primary Examiner.*

D. MASSENBERG, *Assistant Examiner.*